(12) United States Patent
Croxford et al.

(10) Patent No.: US 12,032,155 B2
(45) Date of Patent: Jul. 9, 2024

(54) METHOD AND HEAD-MOUNTED UNIT FOR ASSISTING A HEARING-IMPAIRED USER

(71) Applicant: Arm Limited, Cambridge (GB)

(72) Inventors: Daren Croxford, Swaffham Prior (GB); Laura Johanna Lähteenmäki, Cambridge (GB); Sean Tristram LeGuay Ellis, Farnham (GB)

(73) Assignee: Arm Limited, Cambridge (GB)

( * ) Notice: Subject to any disclaimer, the term of this patent is extended or adjusted under 35 U.S.C. 154(b) by 11 days.

(21) Appl. No.: 17/445,670

(22) Filed: Aug. 23, 2021

(65) Prior Publication Data

US 2022/0066207 A1 Mar. 3, 2022

(30) Foreign Application Priority Data

Aug. 26, 2020 (GB) ..................... 2013373

(51) Int. Cl.
| | |
|---|---|
| *G09G 5/00* | (2006.01) |
| *G02B 27/00* | (2006.01) |
| *G02B 27/01* | (2006.01) |
| *G06F 3/01* | (2006.01) |
| *G06F 40/40* | (2020.01) |
| *G06V 40/20* | (2022.01) |

(Continued)

(52) U.S. Cl.
CPC ..... *G02B 27/0093* (2013.01); *G02B 27/0101* (2013.01); *G02B 27/017* (2013.01); *G06F 3/013* (2013.01); *G06F 40/40* (2020.01); *G06V 40/20* (2022.01); *G10L 15/005* (2013.01); *G10L 15/16* (2013.01); *G10L 15/25* (2013.01); *H04R 1/326* (2013.01); *G02B 2027/0138* (2013.01); *G02B 2027/0178* (2013.01)

(58) Field of Classification Search
CPC .... G02B 2027/0138; G02B 2027/0178; G02B 27/0093; G02B 27/0101; G02B 27/017; G06F 3/013; G06F 40/40; G06V 40/20; H04R 1/326; H04R 2430/20; H04R 3/005; G10L 15/005; G10L 15/16; G10L 15/25; G10L 15/26
See application file for complete search history.

(56) References Cited

U.S. PATENT DOCUMENTS

| | | | | |
|---|---|---|---|---|
| 7,400,711 B1 * | 7/2008 | Ford | ....................... | H04M 3/56 379/70 |
| 11,234,073 B1 * | 1/2022 | Xu | .................... | G10K 11/17857 |

(Continued)

OTHER PUBLICATIONS

United Kingdom Combined Search and Examination report dated Feb. 5, 2021 for United Kingdom Application No. GB2013373.2.

(Continued)

*Primary Examiner* — Jonathan M Blancha
(74) *Attorney, Agent, or Firm* — EIP US LLP

(57) ABSTRACT

A head-mounted unit for assisting a user, such as a hearing-impaired user, is provided. The head-mounted unit comprises tracking sensors for monitoring a user wearing the head-mounted unit in order to determine a gaze direction which the user is looking. A sensor detects a sound source located in the identified gaze direction. Sound from the sound source may be recognised using speech recognition on captured audio from the sound source or computer vision on images of the sound source. A user interface provides information to the user to assist the user in recognising sound from the sound source.

12 Claims, 5 Drawing Sheets

(51) Int. Cl.
    *G10L 15/00*    (2013.01)
    *G10L 15/16*    (2006.01)
    *G10L 15/25*    (2013.01)
    *H04R 1/32*     (2006.01)

(56) References Cited

U.S. PATENT DOCUMENTS

| | | | | |
|---|---|---|---|---|
| 2006/0167687 A1* | 7/2006 | Kates | ............... | G09B 21/00 |
| | | | | 704/235 |
| 2014/0337023 A1* | 11/2014 | McCulloch | ............ | G06F 3/011 |
| | | | | 704/235 |
| 2016/0080874 A1* | 3/2016 | Fullam | ............... | G06F 3/165 |
| | | | | 381/313 |
| 2016/0277850 A1* | 9/2016 | Li | ............ | H04R 25/40 |
| 2018/0047395 A1* | 2/2018 | Sommers | ............... | H04N 7/157 |
| 2018/0096206 A1* | 4/2018 | Yuki | ............... | G06V 20/10 |
| 2018/0130471 A1* | 5/2018 | Trufinescu | ............ | G06F 9/453 |
| 2018/0174586 A1 | 6/2018 | Zamora Esquivel et al. | | |
| 2020/0066294 A1* | 2/2020 | Zass | ............... | G10L 17/00 |

OTHER PUBLICATIONS

Sonova, "RogerTM for challenging listening situations", May 18, 2020, https://www.phonak.com/uk/en/hearing-aids/accessories/roger-clip-on-mic.html.

Assael et al., "Lipnet: End-To-End Sentence-Level Lipreading", Dec. 16, 2016.

Park et al., "A Fully Convolutional Neural Network for Speech Enhancement", Sep. 22, 2016.

Errattahi et al., "Automatic Speech Recognition Errors Detection and Correction: A Review", Oct. 18, 2015.

"Practical Deep Learning Audio Denoising", Dec. 18, 2019, https://sthalles.github.io/practical-deep-learning-audio-denoising/.

Bhashkar, Kunal, "Build your own Chat bot (text Pre-processing)", Jan. 13, 2019, https://medium.com/@BhashkarKunal/conversational-ai-chatbot-using-deep-learning-how-bi-directional-lstm-machine-reading-38dc5cf5a5a3.

* cited by examiner

METHOD AND HEAD-MOUNTED UNIT FOR ASSISTING A HEARING-IMPAIRED USER

CROSS-REFERENCE TO RELATED APPLICATIONS

This application claims priority pursuant to 35 U.S.C. 119(a) to United Kingdom Patent Application No. 2013373.2, filed Aug. 26, 2020, which application is incorporated herein by reference in its entirety.

TECHNICAL FIELD

The present invention relates to a method and head-mounted unit for assisting a user. The method and head-mounted unit may, in some embodiments, be for assisting hearing-impaired users within information about a sound source.

BACKGROUND

It is estimated that around 1 in 6 of the UK adult population is affected by hearing loss. Around 8 million of these people are over 60 and around 6.7 million could benefit from hearing aids (source: Hearing Link—a UK hearing loss charity). Conventional hearing aids include a microphone, an amplifier and a speaker. These components serve to amplify ambient sound to make it easier for a user with hearing loss to hear. However, because the amplifier amplifies the sound local to a user, it can still be difficult for people suffering from hearing loss to hear in noisy environments.

Some solutions for this problem have been proposed. A product called 'Roger clip-on mic' by Phonak, a Sonova AG® company, is a clip-on microphone that transmits audio from the microphone to a hearing aid. In use, the clip-on microphone can be given to another person, such as a person making a presentation, and the wearer of the hearing aid can hear the other person more clearly without being distracted by background noise that might be present between the wearer and the other person.

Unfortunately, there are situations in which the use of a clip-on microphone is inconvenient for the hearing-impaired user. The user may find it inconvenient or embarrassing to have to approach a presenter before a presentation has started. Further, asking a presenter to put a microphone on may be disruptive or impossible if joining a presentation part way through. In situations in which the hearing-impaired user wishes to hear several different people, providing each person that they wish to hear with a microphone is often impractical.

SUMMARY

According to a first aspect, there is provided a method, performed by a head-mounted unit, for assisting a user, the method comprising: monitoring a user wearing the head-mounted unit in order to determine a gaze direction in which the user is looking; detecting a sound source located in the identified direction, the sound source comprising a person; determining whether or not a conversation is being held with the person by at least one of: detecting whether the user and the person speak sequentially; and detecting speech from the person based on at least one of computer vision and speech recognition performed on an audio signal from a directional microphone, and using a neural network to analyse the detected speech to determine whether a conversation is taking placed; and providing information to the user to assist the user in recognising sound from the sound source.

According to a second aspect there is provided a non-transitory computer-readable storage medium storing a program that, when executed by a head-mounted display, causes the head-mounted display to perform a method for assisting a user, the method comprising: monitoring a user wearing the head-mounted unit in order to determine a gaze direction in which the user is looking; detecting a sound source located in the identified gaze direction, the sound source comprising a person; determining whether or not a conversation is being held with the person by at least one of: detecting whether the user and the person speak sequentially; and detecting speech from the person based on at least one of computer vision and speech recognition performed on an audio signal from a directional microphone, and using a neural network to analyse the detected speech to determine whether a conversation is taking placed; and providing information to the user to assist the user in recognising sound from the sound source.

According to a third aspect there is provided a head-mounted unit for assisting a user, the head-mounted unit comprising: tracking sensors configured to monitor a user wearing the head-mounted unit in order to determine a gaze direction in which the user is looking; a sensor configured to detect a sound source located in the identified gaze direction, the sound source comprising a person; a processor and storage medium storing instructions, wherein the processor is configured to determine whether or not a conversation is being held with the person by at least one of: detecting whether the user and the person speak sequentially; and detecting speech from the person based on at least one of computer vision and speech recognition performed on an audio signal from a directional microphone, and using a neural network to analyse the detected speech to determine whether a conversation is taking placed; and a user interface configured to provide information to the user to assist the user in recognising sound from the sound source.

Further features and advantages will become apparent from the following description of preferred embodiments, given by way of example only, which is made with reference to the accompanying drawings.

DETAILED DESCRIPTION

Figure 1:
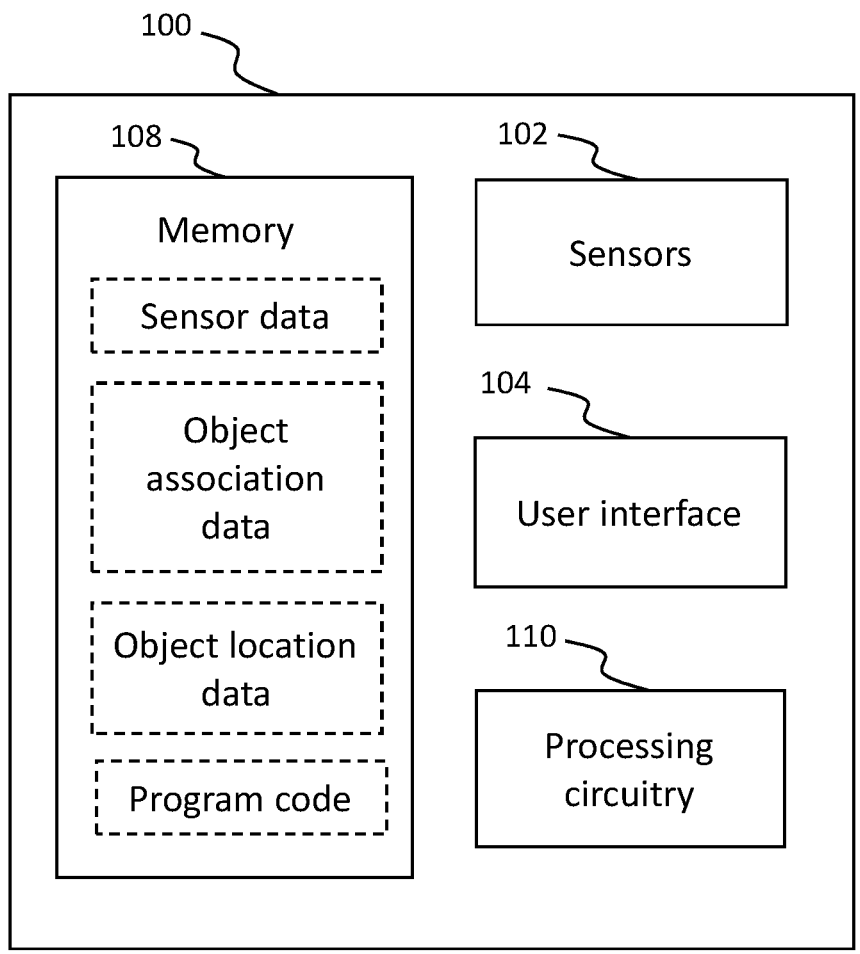
FIG. 1 is a schematic diagram showing components of an XR system.

Specific embodiments will be described with reference to the figures. However certain more general aspects and embodiments are first described.

According to a first aspect, there is provided a method, performed by a head-mounted unit, for assisting a user, the method comprising: monitoring a user wearing the head-mounted unit in order to determine a gaze direction in which the user is looking; detecting a sound source located in the identified direction; and providing information to the user to assist the user in recognising sound from the sound source. Embodiments allow a sound source to be identified based on the direction in which a user is looking and to provide information to the user to allow the user to recognise sound from that specific sound source.

Monitoring the user may be performed by eye-tracking using sensors of the head-mounted unit to track eyes of the user. The gaze direction may be determined based on the tracked position of the eyes of the user.

The sound from the sound source may be speech. In other embodiments, the sound may be a sound other than speech, such as music, clapping, etc. that has been recognised from the sound source. The sound source may be a person identified by a person detection process or may be an object detected by an object detection process.

In some embodiments, the step of identifying the sound source comprises capturing one or more images in the gaze direction and performing computer vision on at least one captured image in order to identify a sound source.

A camera may generate video data made up of images taken in a direction including the gaze direction and the method may perform automated lip reading on at least a portion of the generated video data. In such embodiments, the information provided to the user is based on the result of the automated lip reading. The automated lip-reading may be performed on a portion of the video data in which a mouth portion of a person has been localized.

The method may comprise directing a directional microphone in a direction including the direction of a detected sound source. In such embodiments, the information provided to the user may be based on sound detected by the directional microphone.

In some embodiments, in addition to detecting sound in the direction of the detected sound source, sound is detected from other directions. The method may comprise performing a sound recognition process on the sound detected from other directions, and in a case that a predetermined sound is recognised by the sound recognition process, notifying the user of the recognised predetermined sound.

In embodiments in which a directional microphone is used, speech recognition may be performed on a sound signal from the directional microphone. The information provided to the user may be based on the result of the speech recognition.

In some embodiments, voice recognition may be performed on the sound signal from the directional microphone. The method may include altering a voice within a sound signal from the directional microphone to have a different accent. In such embodiments, the information provided to the user may include playing the altered voice to the user.

Information may be provided to the user via a user interface. Information may be provided to the user in different ways including one or more of displaying text on a display, amplified playback of sound through an audio unit, and displaying hand-signs on a display. The audio unit may be speakers, headphones, earphones, bone-conducting headphones, a hearing aid, or any other type of audio playback device.

If a sound from the sound source is speech, a language included in the speech may be recognised. The method may include translating the speech from the recognised language to another language.

The step of detecting a sound source may comprises detecting a person. The method may comprise detecting whether or not the person is speaking by performing one or more of: detecting movement of a mouth portion of the person; directing a directional microphone in the direction of the person and performing speech recognition on the sound recorded by the directional microphone.

The method may further comprise determining whether or not a conversation is being held with the person by detecting whether a user and the person speak sequentially. Additionally or alternatively, a conversation may be recognised by detecting speech from the person based on at least one of computer vision and speech recognition performed on an audio signal from a directional microphone and using a neural network to analyse the detected speech to determine whether a conversation is taking place. Further, a conversation may be recognised by receiving an input from the user to indicate that they are having a conversation with the person.

In a case in which it is determined that a conversation is being held with a person, the method may comprise tracking the person. The person may be tracked by mapping an area around the head-mounted unit and tracking a location of the person within the mapped area.

A directional microphone may be controlled to pick up sound in a direction that tracks the person. Further or alternatively, a camera may be controlled to capture video in a direction that tracks the person.

The method may further determine whether an additional person is to be added to a conversation. Adding an additional person may include determining that the user is not looking at a person already included in the conversation, capturing one or more images in the new gaze direction and performing computer vision on at least one captured image in order to identify the additional person within the one or more captured images. The method may further include determining whether or not a conversation is being held with the additional person by one or more of: detecting whether the user, one or more people already included in the conversation and the additional person speak sequentially; detecting speech from the additional person based on at least one of computer vision and speech recognition on an a sound signal, and using a neural network to analyse detected speech from the user, one or more people already included in the conversation and the additional person to determine whether a conversation is taking place; and receiving an input from the user to indicate that a conversation is being held with the additional person.

The step of receiving an input from the user to indicate that a conversation is being held with the additional person may be performed by a hand gesture from the user detected by a camera of the head-mounted unit.

According to a second aspect there is provided a program that, when executed by a head-mounted display, causes the head-mounted display to perform a method according to the first aspect.

According to a third aspect there is provided a head-mounted unit for assisting a user, the head-mounted unit comprising: tracking sensors configured to monitor a user wearing the head-mounted unit in order to determine a gaze direction which the user is looking; a sensor configured to detect a sound source located in the identified gaze direction; and a user interface configured to provide information to the user to assist the user in recognising sound from the sound source.

Specific embodiments will now be described with reference to the figures.

FIG. 1 is a schematic diagram showing components of an extended reality (XR) system 100. The term 'extended reality' is used in the present application, but the terms mixed reality (MR), virtual reality (VR) and augmented reality (AR) are also used in the art. The term 'extended reality' should be understood in its broadest sense to encompass all those terms and cover all types of immersive technologies. The XR system 100 includes an XR device, such as a headset, a pair of smart glasses, or any other type of suitable wearable device as will be described in greater detail in connection with FIG. 2. The functions of the XR device are, in general, supported by processing performed by other devices, such as processing performed by a connected mobile device, such as a mobile phone or laptop. Further, the XR device may be connected to the internet and may access cloud processing and storage either directly or via a connected mobile device.

The XR system 100 includes one or more sensors 102 arranged to generate sensor data representing part of an environment in which a user of the XR system 100 is located. The sensors 102 include one or more cameras for generating image data representing part of the environment falling within a field of view of the one or more cameras. A forward-facing camera is arranged to face in substantially the same direction as the head of a user wearing an XR headset. A further wide-angle camera may be provided to capture a wide field of view surrounding the user. In this way, image data from a user's field of view and image data from outside of a user's field of view may be captured.

The sensors 102 include depth sensors to captured depth information. The depth sensors may include stereo cameras from which the XR system 100 can derive, using stereo matching, depth information indicating distances to objects in the environment. In other embodiments, the depth sensors include an infrared camera, a sound navigation ranging (sonar) transceiver, and/or a light detection and ranging (LIDAR) system. In some embodiments, no depth sensors are provided in the XR system 100 and no depth information is determined. In other embodiments, depth information may be derived from images captured by a camera using a convolutional neural network for monocular depth estimation. The XR system 100 is configured to combine image data and associated depth information to generate a three-dimensional representation of part of the environment, for example in RGB-D format, and/or as a point cloud or volumetric representation.

The sensors 102 include position sensors for determining a location and/or orientation (referred to collectively as a position or pose) of the user of the XR system 100. The position sensors include a global positioning system (GPS) module, one or more accelerometers, and/or a Hall effect magnetometer for determining orientation (an electronic compass). The one or more accelerometers may be included in an inertial measurement unit. The XR system 100 is additionally capable of determining or refining an estimated position of the user by analysing image data and/or depth information using simultaneous location and mapping (SLAM) techniques. This SLAM process is, in general, not processor intensive and is run continuously while the XR system 100 is operational.

The XR system 100 includes a user interface 104 via which the user can interact with the XR system 100. The user interface 104 includes input devices and output devices, some or all of which may be part of the same XR device as the sensors 102. The output devices include one or more displays for providing visual information to the user. The one or more displays may include an opaque display arranged to generate and display image data corresponding to a representation of part of the environment generated using the one or more cameras and/or depth sensors, with additional information or virtual objects overlaid or otherwise combined with the generated representation of the environment. A transparent display may be provided through which the user can directly observe the environment, and on which information or virtual objects are projected, for example using waveguiding or laser scanning display technology.

The output devices may include one or more speakers, for example mounted in an earpiece or headphones, allowing the XR system 100 to output information to the user in the form of audio. The speakers may include a bone-conducting speaker that allows a user to continue to hear ambient sounds as well as those generated by the speaker.

The input devices of the user interface 104 are arranged to receive information from the user of the XR system 100. The input devices include one or more local microphones for capturing speech or other sounds made by the user. Additionally, the input devices include a microphone array for detecting external sounds from which the XR system 100 can determine a direction of an audio source. The microphone array is a beam-forming microphone array (alternatively referred to as a steerable microphone array) that allows sounds to be picked up from a specified direction using digital signal processing. Using the local microphone(s) and the microphone array, the XR system 100 can distinguish sounds made by the user from other sounds in the environment.

The input devices include one or more eye-tracking sensors arranged to track orientations and/or motion of the user's eyes. An eye-tracking sensor may, for example, be an optical eye-tracking sensor capable of tracking an orientation of an eye by analysing images of the eye generated by an eye-facing camera, such as an infrared camera. An eye-tracking sensor may generate eye-tracking data from which the XR system 100 can determine which part of the environment, or which object in the environment, the user is currently looking at.

The input devices further include buttons or touch input devices. For example, the XR system 100 may include one or more scroll-wheels, touch-sensitive regions or trackpads. The input devices may include hardware and/or software to make use of gesture recognition, eye tracking/blinking, and speech recognition. In further variations, user interface functions may be provided by the user interface of a separate device in communication with the remainder of the XR system 100, such as a mobile phone touch screen. As mentioned above, the input devices may be part of an XR device housing the sensors 102 or may be part of a separate remote device.

The XR system 100 includes a memory 108 and processing circuitry 110. The memory 108 and the processing circuitry 110 may be part of an XR device housing the sensors 102. Alternatively, as mentioned earlier, some of the memory 108 and the processing circuitry 110 may be part of one or more separate devices, for example a dedicated computing device, a smartphone, a tablet or laptop computer, a desktop computer, a server, or one or more devices in a networked system. In examples, certain data storage and processing tasks take place locally at an XR device, whilst other data storage and processing tasks take place remotely. In this way, the data storage and processing performed by the XR device can be kept to a necessary minimum, allowing the XR device to have a size, weight and form factor that are practical and attractive for prolonged use and/or everyday use of the XR device.

The memory circuitry 108 includes non-volatile storage, for example in the form of one or more solid-state drives (SSDs), and/or NVRAM (Non-Volatile RAM) along with volatile random-access memory (RAM), for example static random-access memory (SRAM) and dynamic random-access memory (DRAM). Other types of memory can be included, such as removable storage, synchronous DRAM, and so on.

The processing circuitry 110 may include various processing units including a central processing unit (CPU), a graphics processing unit (GPU) and/or a specialist neural processing unit (NPU) for efficiently performing neural network operations. Neural networks may be used for certain tasks including object detection and SLAM, as will be described in more detail hereafter. The processing circuitry 110 may include other specialist processing units, such as application specific integrated circuits (ASICs), digital signal processors (DSPs), or field programmable gate arrays (FPGAs).

The memory 108 holds machine-readable instructions in the form of program code which, when executed by the processing circuitry 110, cause the XR system 100 to perform methods as described hereinafter. The memory 108 is also arranged to store further data for use in performing said methods.

Figure 2:
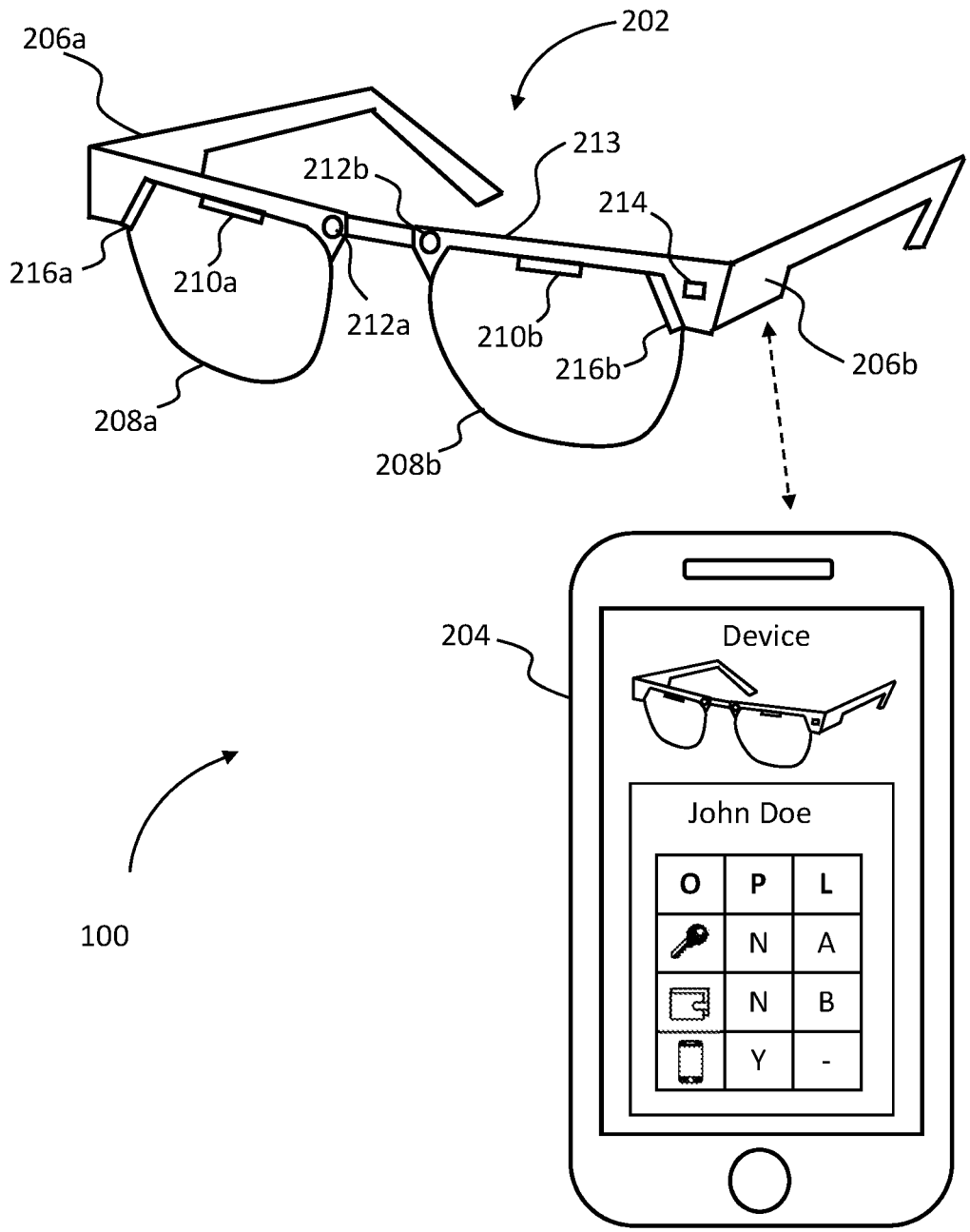
FIG. 2 depicts a pair of smart glasses 202 and an associated app.

FIG. 2 illustrates a pair of smart glasses 202 and an associated app on a smartphone 204 forming part of an XR system 100. The smart glasses 202 include a central frame portion 213 and two folding arms 206a, 206b, where the central portion 213 acts as a support for two lenses 208a, 208b. The central frame portion 213 and the arms 206a, 206b house various sensors and user interface components, as will be described below. The lenses 208a, 208b in this example are neutral, though in other examples the lenses could be corrective lenses matching a prescription of a specific user, and/or could be tinted, for example in the case of smart sunglasses. Each of the lenses 208a, 208b is a transparent display on which a corresponding projection component 210a, 210b is arranged to display information for the user.

The central frame portion 213 houses two front-facing cameras 212a, 212b and side cameras (not shown) to capture images surrounding the user. The XR system 100 is arranged to analyse image data generated by the front-facing cameras 212a, 212b using stereo matching to determine depth information. The central frame portion 213 further houses a beam-forming microphone array 214 for receiving sound input both from the user and from the surrounding environment, and optical eye-tracking sensors 216a, 216b for tracking orientations and motion of the user's right and left eye respectively. The optical eye-tracking sensors 216a and 216b include associated processing circuitry for determining a direction in which the user is looking. The associated processing circuitry may include a neural processing unit (NPU) or an ASIC built into the smart glasses 202. The determination of the direction that a user is looking may be performed in different ways, but in the embodiment is performed using a trained convolutional neural network that can determine a probability that a user is looking in a particular direction based on eye position detected by the optical eye-tracking sensors 216a and 216b. The arms 206a, 206b house a dedicated power supply, processing circuitry and memory circuitry, as well as a global positioning system (GPS) receiver, an electronic compass, and accelerometers. The arms also include a communication module including an antenna for communicating wirelessly with the smartphone 204 running the associated app. It is noted that whilst the wireless communication module allows communication with the mobile smartphone 204, the smart glasses may be used as a standalone device without continuous communication with the smartphone 204.

The smart glasses 202 include speakers (not shown), which cover the user's ears. In other embodiments, the smart glasses 202 are coupled to in-ear headphones or a hearing aid, e.g. by Bluetooth®, and can provide sound to a user through the in-ear headphones. In an advantageous variant, the arms of the smart glasses 202 include bone conducting speakers, which provide sound to the user by vibration whilst continuing to allow the user to hear what is happening locally.

The AR system 100 is arranged to determine a position (i.e. location and orientation) of the user using the onboard GPS receiver and the electronic compass of the smart glasses 202, and/or by processing image data from the cameras 212a, 212b using SLAM. The XR system 100 is configured to continually monitor the position of the user, but in other embodiments may determine the position of the user only when certain events are detected (for example, when movement of the user is detected by the accelerometers). In other embodiments, GPS positioning information may be provided by a connected Smart Phone. Alternatively, or in addition, location and orientation information can be provided using SLAM.

XR systems including various combinations of the features described above are available commercially. Examples include Microsoft® Hololens® 2 and Magic Leap® 1. Various methods are described below, and it will be appreciated that the configuration of hardware required for each method depends upon the sensors used in that method.

The app on the smartphone 204 can be used to configure the smart glasses 202 in accordance with preferences of the user. For example, the user can use the app to select the type of information that is displayed on the lenses 208a, 208b, and whether the smart glasses 202 continually monitor the location of the user as mentioned above. The app has associated storage on the smartphone 204, which may be used in addition to the memory circuitry of the smart glasses 202 to store data for use by the XR system 100. The XR system 100 can further utilise processing capabilities of the smartphone 204 to perform certain resource-intensive processing tasks, such as SLAM. Sharing the storage and processing requirements of the AR system 200 between the smart glasses 202 and the smartphone 204 allow for the size, weight and form factor of the smart glasses 202 to be similar to a regular pair of glasses, such that a user can comfortably wear the smart glasses 202 for prolonged periods of times, and on an everyday basis. Although the smart glasses are described in conjunction with a smartphone 204 in this figure, the smart glasses may be configured as a standalone device.

Figure 3:
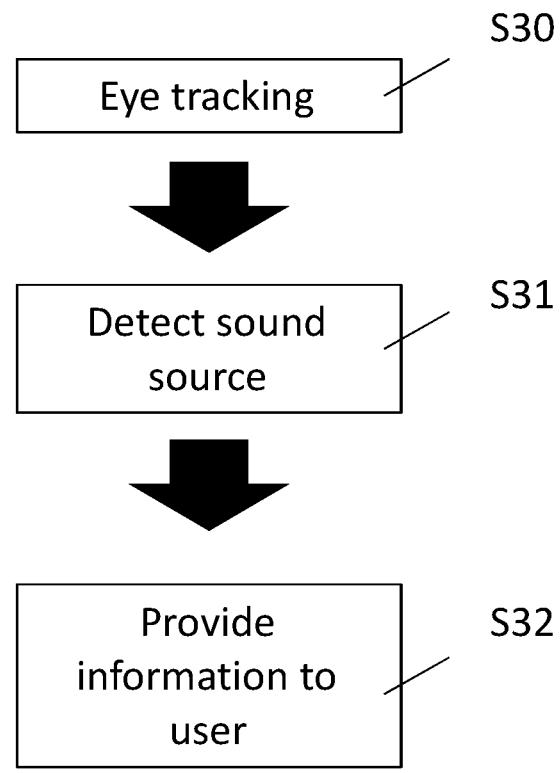
FIG. 3 is a flow chart showing steps for providing information to a user with impaired hearing.

FIG. 3 is a flow chart showing steps for providing information to a user. In step S30, the optical eye-tracking sensors 216a and 216b track the user's eyes and the associated processing circuitry determines a direction in which the user is most likely looking. In parallel, the front-facing cameras 212a and 212b record images and store the images in memory 108. In step S31, an image or partial image captured by the front-facing cameras 212a and 212b is read from memory 108 which includes image data capturing an area around the direction in which the user is looking according to the determination made in step S30. The angle of view covered by the image or partial image may be selected based on the degree of confidence that the neural network provides for the direction in which the user is looking. In some embodiments, the angle of view of the image or partial image is selected to be in the region of 15 to 45 degrees in order to restrict the image to an area that the user is most likely looking at.

In step S31, computer vision is performed on the image to identify a sound source within the image. In the present embodiment, the computer vision processing is a person detection process to determine if there is a person within the image. The person detection is preferably performed using a neural network, such as using a region-based convolutional neural network (R-CNN) such as one based on ResNet. The use of a region-based convolutional neural network allows the position of the person within the image to be localised. If no person is detected, the method ends at step S31. However, if a person is detected, the beam-forming microphone array 214 is controlled to detect sound from the direction in which the person is detected. An optional step of cleaning sound from the directional microphone may now be performed. Sound detected from a distance may include ambient noise and other distortions due to reflection or interference of the sound waves. Audio denoising can be used to clean up the audio signal. Machine learning networks currently provide a good approach for audio denoising. For example, a CR-CED (Cascaded Redundant Encoder-Decoder Network) has been proposed by Rim Park and Jinwon Lee in their paper 'A Fully Convolutional Neural Network for Speech Enhancement' published by Cornell University arXiv:1609.07132.

The audio signal, with or without de-noising, may additionally be analysed using speech recognition software in order to determine if there is speech in the audio signal from the beam-forming microphone. Speech recognition processing is well known and is integrated into smart phone assistants and other voice controls for computing devices. Accordingly, a suitable speech recognition program is used for the speech recognition on an audio signal from the beam-forming microphone. If no speech is detected, the method ends at step S31. However, if speech is detected then the method proceeds to step S32.

In step S32, information is provided to assist the user. There are several ways of presenting information to the user and the presentation method may be selected based on available hardware and/or user preferences. A first way to provide information to the user is to provide an amplified sound to the user via the speakers. The combination of use of a beam-forming microphone, de-noising processing performed on the microphone audio signal, and amplification of the audio signal before playback by the speaker may make it easier for a user to hear sound from a distant speaker or a sound from a speaker in a noisy environment.

A second way of presenting information to a user is to display the recognised speech to the user as text. In this case, the speech recognition program described above is used to process the audio signal from the beam-forming microphone. The speech recognition program generates text corresponding to speech detected in the audio signal. The text is displayed to the user on a display, such as by projection onto the lenses 208a and 208b, allowing the user to read what is being said. This method of presenting information is particularly helpful for users with severe hearing impairment or total hearing loss. Alternatively, or in addition, the recognized speech may be presented to the user on the lenses 208a and 208b in sign language. In the case of display by sign language a series of signs corresponding to the recognised speech content are displayed to the user on the lenses 208a and 208b to allow the user to read the recognised speech content.

In the embodiment above, the beam-forming microphone array 214 is used to detect sound from the direction in which the user was determined to be looking. In a further embodiment, instead of using the beam-forming microphone, video is captured by the cameras in a direction that includes a direction in which the person was detected. Face recognition is performed on the captured video and a mouth portion of a face is identified and localised. The identification of the mouth region is, as with the person detection, preferably performed using a region-based convolutional neural network such as one based on ResNet.

The localised video of the mouth region is analysed by performing lip reading to recognise what the person is saying based on lip movements in the video of the mouth region and recording the recognised speech as text. An example of a neural network trained to perform lip reading is discussed in lipNet: End-to-End Sentence-level Lipreading' by Yannis M Assael, Brendan Shillingford, Shimon Whiteson, and Nando de Freitas, published by Cornell University as arXiv:1611.01599. Based on the computer-vision based analysis of captured video, text corresponding to speech is generated. The text may be displayed to a user by projection onto the lenses 208a and 208b, as discussed previously, or converted into signs and displayed to the user.

Confirmation of whether or not there is speech occurring may optionally be performed on the identified mouth region by determining whether or not the lips in the captured video are moving. If this step is performed, the automated lip-reading may only be performed if it is determined that speech is occurring.

The speech recognition and lip-reading approaches discussed above may be combined. In such an implementation, an audio signal from the beam forming microphone is analysed by the speech recognition program and video from the cameras is analysed by the computer-vision and lip-reading processes. The text from the speech recognition and the text from the lip-reading recognition can be combined to improve overall accuracy of the XR system 100. This combination may involve comparing confidence levels of words detected by the speech recognition program and by the lip-reading program and, in a case where the words detected don't match, picking the word with the higher confidence level. Other approaches include analysing combinations of words, which include a word that has been detected differently by the speech recognition and lip-reading programs and words either side of that word. The combinations of words from each of the speech recognition and the lip-reading program are analysed to determine the more likely combination of words. Error detection in automated speech recognition has been considered in the art and is discussed in the paper 'Automatic Speech Recognition Errors Detection and Correction: A Review' by Rahhal Errattahi, Asmaa El Hannani, and Hassan Ouahmane' International Conference on Natural Language and Speech Processing, ICNLSP 2015. Accordingly, similar approaches may be applied to identify errors in recognition by the speech recognition and lip-reading programs and to correct them.

Further variations of the lip-reading method are contemplated. For example, rather than performing automated lip-reading, the video of the mouth region identified by the region-based convolutional neural network may be displayed to the user on a display. The image displayed to the user may be an enlarged image of the region of the mouth. This may make it easier for the user to see the movements of the mouth of a person that they are looking at, which might otherwise be difficult to distinguish from a distance. This display method could be combined with the automated lip-reading approach, so that subtitles are displayed below the enlarged video image of the mouth region displayed in the display.

Several different methods of providing information to a user have been identified above. The method of providing information to the user may be configured to change dynamically depending on the situation. For example, when a user is looking at a person, a video of an enlarged the mouth region may be displayed to the user on the display. However, if the XR system 100 detects that the user has looked away from the identified person, perhaps to focus on something else, the display may change to another way of providing information, such as providing enhanced audio through the speakers or by displaying signs or text. Tracking of the detected person in a case in which the user looks away will be discussed in more detail in connection with FIG. 4.

Additional processing may be performed when detecting the sound source in step S31. The XR system 100 may perform person recognition in addition to the person detection previously described. The person recognition would be performed against a database of biometric details of contacts known to the user of the smart glasses 202. As will be discussed in more detail below, the database details could be associated with a user profile of the wearer of the smart glasses 202. Person recognition may be performed by the AR system 100 in a case in which more than one person is detected within the image analysed in step S31. In this case, XR system 100 may preferentially select a person from the image that is recognised from the database of biometric details as the target for the beam-forming microphone or for lip-reading. A message may be displayed on the lenses 208*a* and 208*b* to ask a user to confirm whether or not the correct person has been selected. The user may confirm whether or not the correct person has been selected using an input device.

An alternative or complementary approach to person recognition is to perform voice recognition on the audio signal from the beam-forming microphone to determine the identity of the person speaking. Using either voice recognition or computer vision, the identity of the person speaking provides useful context information for other applications for the smart glasses 202, such as allowing the smart glasses 202 to display contact details or a business card for the person that has been recognised.

Figure 4:
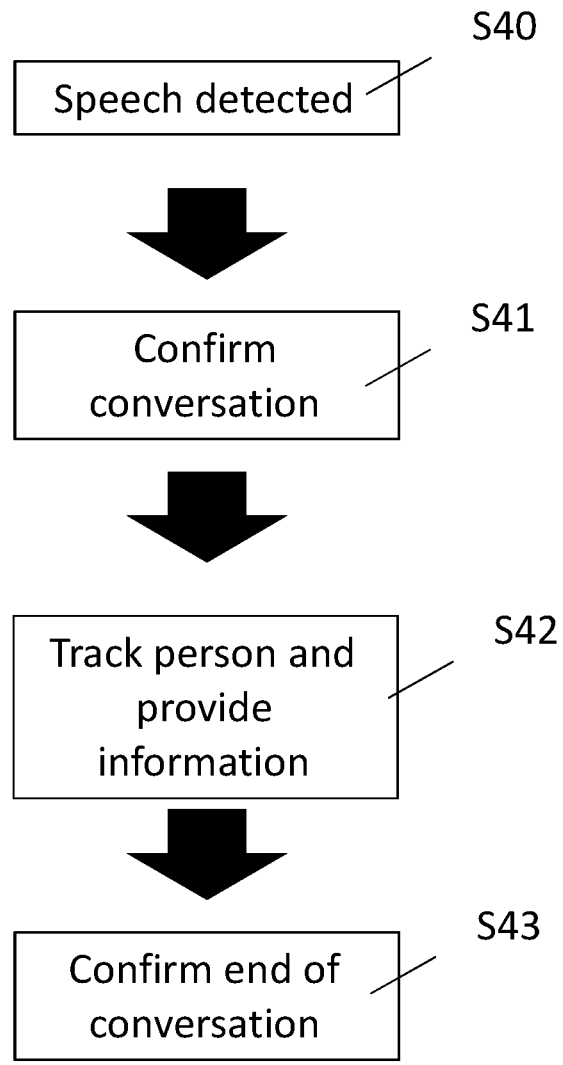
FIG. 4 is a flow chart of steps to determine whether a user is engaged in a conversation.

Further functions of the smart glasses 202 relating to conversations will now be described with reference to FIGS. 4 and 5. FIG. 4 is a flow chart of steps to determine whether a user is engaged in a conversation. The conversation detection method starts from a situation described in connection with FIG. 3 in which the direction in which a user is looking has been detected, computer-vision has been performed to detect a person in the direction in which the user is looking, and the beam forming microphone is being used to pick up sound from the direction of the detected person. Description of these steps will not be repeated. The audio signal from the microphone is subject to speech recognition in S40 as previously described. In steps S41, processing is performed to determine if a conversation is being held. This processing may be done with or without input from the user. For example, after a period in which speech has been detected by the speech recognition program, the smart glasses 202 may display a message on the lenses 208*a* and 208*b* asking the user 'Are you in a conversation?'. The user may confirm to the smart glasses 202 whether he or she is in a conversation by use of an input device. In one example, the user may respond to the prompt by using hand gestures to indicate to the smart glasses 202 that a conversation is taking place. For example raising the user's right hand in the view of the front cameras 212*a* and 212*b* may indicate that a conversation is taking place, whereas raising the user's left hand in front of the front cameras 212*a* and 212*b* may indicate that a conversation is not taking place.

In other embodiments, conversation detection may be performed automatically based on detected speech. The local microphone of the smart glasses 202 is arranged to pick up sound from the user and the beam-forming microphone is arranged to pick up sound from the surroundings including other users. Typically, in a conversation each person will speak in turn and the conversation will have a natural rhythm. Accordingly, the AR system 100 may determine that a conversation is taking place if speech detected from the user and the detected person are detected as alternating. Typical patterns of speech may be used to train a convolutional neural network and the trained convolution neural network is used to automatically determine whether or not a conversation is taking place.

If it is determined that a conversation is taking place in step S41 the method proceeds to step S42. Otherwise, the method terminates at step S41. In step S42, once it is determined that a conversation is being held with a detected person, the location of the detected person is tracked by the XR system 100. The tracking may be performed by storing the location of the person within the surrounding environment. It is recalled that the smart glasses 202 model the surrounding environment using SLAM. Accordingly, the location of the person within the environment can be determined based on the direction in which the person is detected and depth information from the depth sensors. The location of the detected person is stored as a location in the XR system 100. The location of the person is periodically checked and updated in order to track the person. The process of updating the location of the person involves capturing an image of the region in which the person was previously located, performing person recognition as previously described and updating the location of the detected person. The beam-forming microphone is controlled to continue to collect sound from the direction in which the detected person with whom the user is having a conversation is located. Accordingly, the beam-forming microphone tracks the detected person.

In step S42 the processes described in connection with S32 of providing information to the user are continued. The conversation feature of the smart glasses 202 is useful because having established that a conversation is in progress, the user may now look away from the person that they are in conversation with and still receive information about the speech. This is possible because the XR system 100 is tracking the person with whom the conversation is being held and the beam forming microphone collects sound from the direction of the detected user without the user needing to look continuously in the direction of the person that they are having a conversation with. It is envisaged that this could be useful in many situations, such as when attending a presentation and wanting to look away from the presenter to view displayed slides or when having a conversation during a walk in which is it is necessary to look away from the person that is being spoken with in order to navigate and avoid obstacles. In order to accommodate the user looking in a wide variety of directions, the cameras of the smart glasses 202 may be configured to cover a wide field of view, potentially as wide as a 360-degree field of view. Similarly, in order to allow tracking of the detected person, the beam-forming microphone array may be configured around the smart glasses 202 in order to allow sound pick-up from a wide variety of directions.

In step S43 the conversation is ended. The detection of the end of the conversation may be performed either with or without user interaction. For example, the user may use an input device to indicate that the conversation has ended. Alternatively, the end of the conversation may be detected automatically. For example, certain expressions detected by speech recognition, such as 'goodbye' or 'I'll see you later' may be taken to indicate the end of a conversation. Further, if the person being tracked by the XR system 100 using the cameras disappears from view of the cameras of the smart glasses 202 for a predetermined time period, say 10 to 30 seconds, it may become impossible to for the XR system 100 to track the person in the conversation and it is also likely that the person has left and that the conversation has ended. If automated detection of the end of the conversation is used, a message may be displayed to a user to allow the user to confirm the end of the conversation or to indicate that the conversation is continuing.

Figure 5:
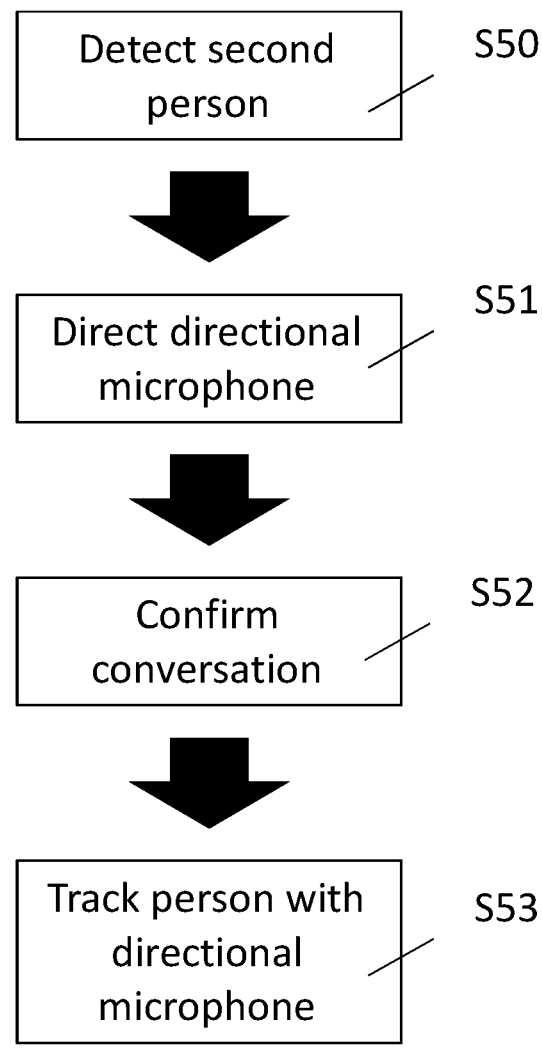
FIG. 5 is a flow chart showing steps for tracking a multi-person conversation involving three or more people.

FIG. 5 is a flow chart showing steps for tracking a multi-person conversation involving three or more people including the user. Starting a conversation involving a single other person has been described in connection with FIG. 4. Accordingly, the method of FIG. 5 may be implemented in a case that a conversation with a single other person has started and is under way in accordance with the method previously described in connection with FIG. 4. In step S50, the user looks away from the first detected person in a new direction. As previously described, the identity of the first person is established due to the first person's location within the area surrounding the user. Optionally, a further step of person recognition, of the types described earlier, could be performed to establish an identity for the first person.

An image or sequence of images is captured in the new direction in which the user is now looking. Person recognition is performed on the image or images captured in the new direction. If a person is not detected, the method ends in step S50. Otherwise, if a person is detected, in step S51, the beam-forming microphone is controlled to pick up sound in the direction of the detected second person. As beam-forming microphones work by digital signal processing to control the direction of the captured audio, it is possible to detect sounds from multiple directions. Accordingly, the beam-forming microphone continues to detect sound from the first person and starts to receive sound from the direction of the detected second person.

In step S52, it is confirmed whether a conversation is being held with the detected second person. This processing is similar to step S41 described above. In some implementations, the user confirms that the detected second person should be added to the conversation by use of an input device in response to a prompt from the smart glasses 202. Alternatively, or additionally, a conversation including the second person may be detected automatically if, for example, speech detected from the user, the first detected person and the second detected person is alternating. As previously described, typical patterns of speech may be used to train a convolutional neural network and the such a neural network may be used to automatically determine whether or not a conversation is taking place based on recognised speech patterns from the user and the two detected people.

In step S53, if it is confirmed that the second person is part of the conversation, the second person is tracked in the same way as described in connection with the first detected person in S42. If it is determined that the second person is not part of a conversation, the method of FIG. 5 ends, but the conversation with the first person continues.

The description of conversations in connection with FIGS. 4 and 5 has been based on tracking with the directional microphone and speech recognition. However, this embodiment could also be implemented using computer vision and lip-reading of the type describe earlier in connection with FIG. 3 or as a combination of speech recognition using sound for a directional microphone and computer vision with lip reading.

The method of FIG. 5 may be repeated to add additional users so that a conversation involving more than three people, including the user, could be configured.

When the conversation ends processing similar to S43 is performed. This may be performed on a person-by-person basis so that if one person leaves and is no longer detected, that person may be removed from the conversation and no longer tracked, while a conversation with the remaining people may continue to be registered by the smart glasses 202.

Further features may be included in the smart glasses 202 to complement or enhance the information provided to the user that was described in connection with FIG. 3. The AR system may include a translation function for translating speech from one language to another language. In this case, speech is recognised by the speech recognition program or the lip-reading program. The text corresponding to recognised speech is then translated into a language selected by the user. The translated speech may be output to the user as text or signs on the lenses 208*a* and 208*b*. In other embodiments the text may be subject to text-to-speech conversion and output to the user via speakers.

In some implementations, the smart glasses 202 may be configured to receive and store a user profile, which includes information about the user, such as the user's preferred language, preferred output methods, volume settings etc. The preferred language stored in the profile may be used to select a target language for the translation function described above. Automatic language detection and/or location information from the smart glasses 202 position sensors may be used to determine the source language. The profile information relating to preferred output methods may include information such as preferences regarding whether the user prefers to view text or signs in the display. In some implementations, the user profile is stored in a cloud storage and is downloaded when the user starts using the smart glasses 202, for example after completing a log-in operation. In this way, if a user uses multiple smart glasses 202 in different situations, the information in the user profile may be synchronized between devices.

In some embodiments, sound detected by the beam-forming microphone may be provided to the user via the speakers of the smart glasses 202. As described above, the audio output to the use may be subject to audio denoising. In further embodiments, speech detected and output in this way may be subject to accent correction. Accent correction involves changing a voice, for example a voice with a Scottish accent, included in an audio signal to another voice. Creation of artificial speech based on real voices and conversion of one voice to another is possible using AI techniques. An example of this is the lyrebird API developed by the AI research department of Descript. Using such techniques, a voice detected in an audio signal from the beam-forming microphone may be converted to a voice that is clearer or which has a more familiar accent to the user. The user's accent preferences may be stored in the user profile.

In other embodiments, the smart glasses 202 may be configured to automatically propose adjustment of the settings of the smart glasses 202 to the user. For example, if the XR system 100 detects words such as 'pardon' or 'sorry' repeatedly in a conversation, the glasses may present options to the user, such as in a menu displayed on the lenses 208*a* and 208*b*, that suggest options such as 'enable accent correction?', 'enable translation function?', 'enable audio denoising?', 'switch from speaker to text display?'. The automatic proposal of adjustment of the settings may also be based on a detected level of background noise, possibly in combination with the detection of certain key words. In this way a user may be conveniently prompted to adjust the settings of the smart glasses 202 in order to better understand what is being said.

A further feature of some embodiments is a function to notify a user in a case in which a predetermined sound is detected. In an embodiment in which a user is listening to amplified sound from the beam-forming microphones, it is likely that the use will be unaware of sounds coming from other directions. However, some sounds from other directions may need to be notified to the user, such as for example an alarm sounding or the sound of an approaching vehicle. Accordingly, in further embodiments sound captured by the array of microphones is analysed to detect certain predetermined sounds and, in a case that a predetermined sound is detected, the detected sound is notified to the user. The notification may be by displaying a message on the lenses 208*a* and 208*b* or could be notified by changing the audio being played to the user via the speakers to allow the user to hear the detected sound. The predetermined sounds that need to be detected and notified will vary depending on the situation. Accordingly, this feature could be particularly useful for industrial or controlled environments in which predetermined sounds that should be notified can be readily anticipated. Another application of this feature is to detect if the name of the user is detected by the microphone. The name of the user can be stored in the user profile information and if an expression such as 'Hey John' is detected for a user named John the AR system may notify the wearer of the smart glasses 202. Further examples of predetermined sounds that could be notified to a user include the sound of a doorbell and the sound of a phone ringing.

The above described embodiments deal with the case in which a user is having a conversation with a person. However, it is also possible to have a conversation with another person using a telecommunications device, such as a smart speaker. The method of FIG. 3 may be adapted to account for this. The user will typically look at their smart speaker or other telecommunications device, such as a smart TV or other TOT device when they initiate a call. The step of detecting a sound source in this case involves identifying the telecommunications device within an image that is captured in the direction in which the user is looking. The detection of the telecommunications device may be performed by an object recognition program. The object recognition program may be of any known type and could be implemented using a region-based convolutional neural network. The smart speaker may be recognised by the object recognition program, and the beam-forming microphone may be directed to receive sound from the direction of the telecommunications device. Once the location of the telecommunications device is identified, the location is stored for future reference. This is advantageous because the processing required for object detection processing is quite intensive, whereas the processing required for maintain location information using SLAM is relatively low. Accordingly, for telecommunications devices, which don't tend to move around, the object detection processing may only be performed occasionally thereby reducing computational load. Additionally, for locations that the user frequently occupies such as the home or a workplace, the XR system 100 may store the location of telecommunication devices. In some implementations, when the XR system 100 determines that the user is in a known environment, the smart glasses 202 may monitor for sounds coming from the direction in which a telecommunications device is known to exist. In this way, the AR system 100 may detect and promptly draw a wearer's attention to sound coming from a telecommunications device, such as an incoming call.

Embodiments described above have been described in the form of smart glasses 202. The smart glasses 202 may be particularly suitable for use by a hearing-impaired user as the additional information provided may allow the hearing-impaired user to understand speech in situations in which it would otherwise be difficult. However, other implementations and use cases have been considered. For example, for a user without impaired hearing, enhanced hearing may be useful in situations such as a noisy nightclub or in noisy industrial situations in which communication over the sound of loud industrial machinery is desired. In further applications, the XR system 100 may allow a user with normal hearing to hear sounds that are further away than the user would normally be able to hear. In connection with industrial applications, the XR system 100 could be implemented in industrial safety glasses or as part of a safety helmet. Further, the XR system 100 could be implemented in or additionally include ear defenders to protect a user from excessive surrounding noise while the wearable device provides information about particular sounds in the environment.

The above embodiments are to be understood as illustrative examples. Further embodiments are envisaged. For example, in the above described embodiments, implementations using a combination of simultaneous location and mapping (SLAM) techniques and person or object recognition using region based convolutional neural networks (R-CNN) have been described. However, an alternative would be to use Semantic SLAM techniques in which moving objects such as people are identified and located within the scene.

Examples have been given above of recognising speech from a detected person and of recognising speech from an object, such as a recognised telecommunications device. In general, a sound source could be a person or another object, such as a television, a telecommunications device, or other object. The recognition processing performed on sound from the sound source may be more general than use of a speech recognition program and may include the ability to identify other sounds such as music, gun shots, clapping, car noise etc. Similar to the above-described embodiments, the recognised sounds may be provided to the user in the form of text descriptions such as 'music', 'clapping' etc. or in the form of signs displayed to the user.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope, which is defined in the accompanying claims.

The invention claimed is:

1. A method, performed by head-mounted unit comprising depth sensors, a camera and a beam-forming microphone, for assisting a user, the method comprising:

monitoring a user wearing the head-mounted unit in order to determine a gaze direction in which the user is looking;

detecting a first person located in the identified gaze direction;

determining whether or not a conversation is being held with the first person by detecting speech from the first person based on speech recognition performed on an audio signal from the beam-forming microphone, and using a neural network to analyse the detected speech to determine whether a conversation is taking place;

in a case that it is determined that a conversation is being held with the first person, for the duration of the conversation tracking the first person by periodically determining a location of the first person within the environment based on a direction in which the first person is detected by the camera and depth information from depth sensors and storing the determined location of the first person;

for the duration of the conversation, controlling the beam-forming microphone to collect sound from the direction in which the first person with whom the user is having a conversation is located;

determining that the user is not looking at the first person already included in the conversation;

capturing one or more images in a new gaze direction and performing computer vision on at least one captured image in order to identify a second person within the one or more captured images;

determining whether or not a conversation is being held with the second person by detecting speech from the second person based on speech recognition on a sound signal, and using a neural network to analyse detected speech from the user, the first person already included in the conversation and the second person to determine whether a conversation is taking place;

in a case that it is determined that a conversation is being held with the second person, for the duration of the conversation, tracking the second person by periodically determining a location of the second person within the environment based on a direction in which the second person is detected by the camera and depth information from depth sensors and storing the determined location of the second person;

for the duration of the conversation, controlling the beam-forming microphone to collect sound from the direction in which the second person with whom the user is having a conversation is located; and providing information to the user to assist the user in recognising sound from the first and second persons, wherein in a case that one of the first person and second person is no longer detected, the person that is no longer detected is no longer tracked, while the remaining person continues to be tracked.

2. A method according to claim 1 wherein monitoring the user comprises performing eye-tracking using sensors of the head-mounted unit to track eyes of the user.

3. A method according to claim 1 wherein detecting the first person comprises capturing one or more images in the gaze direction and performing computer vision on at least one captured image in order to identify the first person.

4. A method according to claim 1 wherein the method further comprises a camera generating video data made up of images taken in a direction including the gaze direction and performing automated lip reading on at least a portion of the generated video data, wherein the information provided to the user is based on the result of the automated lip reading.

5. A method according to claim 1 wherein in addition to detecting sound in the direction of the detected first person and second person, sound is detected from other directions, the method comprising performing a sound recognition process on the sound detected from other directions, and
in a case that a predetermined sound is recognised by the sound recognition process, notifying the user of the recognised predetermined sound.

6. A method according to claim 1 wherein the information provided to the user is based on the result of the speech recognition.

7. A method according to claim 1 further comprising altering a voice within a sound signal from the directional microphone to have a different accent, wherein the information provided to the user includes playing the altered voice to the user.

8. A method according to claim 1 wherein the information provided to the user includes at least one of displaying text on a display, amplified playback of sound through an audio unit, and displaying hand-signs on a display.

9. A method according to claim 1 further comprising a step of recognising a language included in the speech from the first person and translating the speech from the recognised language to another language.

10. A method according to claim 3, wherein detecting the first person comprises detecting the first person within the one or more captured image.

11. A non-transitory computer-readable storage medium storing a program that, when executed by a head-mounted display comprising depth sensors, a camera, and a beam-forming microphone, causes the head-mounted display to perform a method for assisting a user, the method comprising:

monitoring a user wearing the head-mounted unit in order to determine a gaze direction in which the user is looking;

detecting a first person located in the identified gaze direction;

determining whether or not a conversation is being held with the first person by detecting speech from the first person based speech recognition performed on an audio signal from the beam-forming microphone, and using a neural network to analyse the detected speech to determine whether a conversation is taking place;

in a case that it is determined that a conversation is being held with the first person, for the duration of the conversation tracking the first person by periodically determining a location of the first person within the environment based on a direction in which the first person is detected by the camera and depth information from depth sensors and storing the determined location of the first person;

for the duration of the conversation, controlling the beam-forming microphone to collect sound from the direction in which the first person with whom the user is having a conversation is located;

determining that the user is not looking at the first person already included in the conversation;

capturing one or more images in a new gaze direction and performing computer vision on at least one captured image in order to identify a second person within the one or more captured images;

determining whether or not a conversation is being held with the second person by detecting speech from the second person based on speech recognition on a sound signal, and using a neural network to analyse detected speech from the user, the first person already included in the conversation and the second person to determine whether a conversation is taking place;

in a case that it is determined that a conversation is being held with the second person, for the duration of the conversation tracking the second person by periodically determining a location of the second person within the environment based on a direction in which the second person is detected by the camera and depth information from depth sensors and storing the determined location of the second person;

for the duration of the conversation, controlling the beam-forming microphone to collect sound from the direction in which the second person with whom the user is having a conversation is located; and providing information to the user to assist the user in recognising sound from the first and second persons, wherein in a case that one of the first person and second person is no longer detected, the person that is no longer detected is no longer tracked, while the remaining person continues to be tracked.

12. A head-mounted unit for assisting a user, the head-mounted unit comprising:
   depth sensors;
   a camera;
   tracking sensors configured to monitor a user wearing the head-mounted unit in order to determine a gaze direction in which the user is looking;
   a beam-forming microphone;
   a processor and storage medium storing instructions, wherein the processor is configured to:
      detect a first person located in the identified gaze direction;
      determine whether or not a conversation is being held with the first person by detecting speech from the first person based on speech recognition performed on an audio signal from the beam-forming microphone, and using a neural network to analyse the detected speech to determine whether a conversation is taking place;
      in a case that it is determined that a conversation is being held with the first person, for the duration of the conversation tracking the first person by periodically determining a location of the first person within the environment based on a direction in which the first person is detected by the camera and depth information from depth sensors and storing the determined location of the first person;
      for the duration of the conversation, controlling the beam-forming microphone to collect sound from the direction in which the first person with whom the user is having a conversation is located;
      determine that the user is not looking at the first person already included in the conversation;
      capture one or more images in a new gaze direction and performing computer vision on at least one captured image in order to identify a second person within the one or more captured images;
      determine whether or not a conversation is being held with the second person by detecting speech from the second person based on speech recognition on a sound signal, and using a neural network to analyse detected speech from the user, the first person already included in the conversation and the second person to determine whether a conversation is taking place;
      in a case that it is determined that a conversation is being held with the second person, for the duration of the conversation track the second person by periodically determining a location of the second person within the environment based on a direction in which the second person is detected by the camera and depth information from depth sensors and storing the determined location of the second person;
      for the duration of the conversation, control the beam-forming microphone to collect sound from the direction in which the second person with whom the user is having a conversation is located;
      in a case that one of the first person and second person is no longer detected, not to further track the person that is no longer detected, while the remaining person continues to be tracked; and
   a user interface configured to provide information to the user to assist the user in recognising sound from the first and second persons.

* * * * *